3,577,444
SUBSTITUTED ANTHRAQUINONES
Nicholas J. Clecak, San Jose, and Robert J. Cox, Los Gatos, Calif., assignors to International Business Machines Corporation, Armonk, N.Y.
No Drawing. Filed Jan. 8, 1969, Ser. No. 789,928
Int. Cl. C07c 119/10
U.S. Cl. 260—378     3 Claims

ABSTRACT OF THE DISCLOSURE

Anthraquinones having at the 2 and the 6 positions substituents selected from the group consisting of

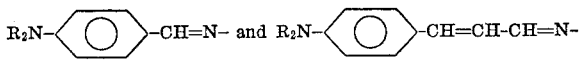

wherein R is lower alkyl. The compounds are useful as dichroic photoconductors and as photosensitizers for photoconductive polymers such as polyvinylcarbazole.

FIELD OF THE INVENTION

The present invention is concerned with the preparation of novel anthraquinones having certain substituents at the 2 and the 6 position and with their use as photoconductors.

PRIOR ART

Although numerous other substituted anthroquinones have previously been known, the compounds of the present invention are entirely novel to the best of our knowledge.

SUMMARY OF THE PRESENT INVENTION 2,6-diaminoanthroquinone is condensed with p-di-lower alkylaminobenzaldehyde or p-di-lower alkylaminocinnamaldehyde to yield the novel compounds of the present invention, which have the formula:

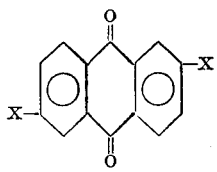

with X being selected from the group consisting of

and

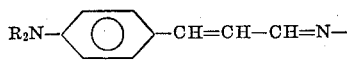

wherein R is lower alkyl.

The novel compounds of the present invention are photoconductive and also exhibit a very high degree of dichroism. They are useful as components of photoconducting plates in electrophotographic processes, particularly by the contact reflex method, as described in U.S. patent application Ser. No. 668,697 filed Sept. 18, 1967 by C. E. Herrick and M. D. Shattuck.

For the preparation of photoconductive elements, it is advantageous for the compounds of the general formula to be dissolved in organic solvents, such as tetrahydrofuran, or any other solvent in which the compounds are at least partially soluble. Such solutions are applied to substrates suitable for electrophotography and the solvent is then removed. Mixtures of solvents can also be used.

Instead of the above preparation, the compounds of the general formula can be used in conjunction with a resinous binder. Suitable resins include both natural and synthetic resins, examples of which are balsam resins, phenol resins modified with colophony, coumarone resins, indene resins, cellulose ethers, polyvinylchlorides, polyvinylacetate, acrylic polymers, such as polymethylacrylic esters, polystyrene, polyisobutylene, polyvinylnormal, polycondensates, such as phthalate resins, polyamides, and polyadducts, such as polyurethanes.

The proportion of resin to the photoconductive compound can vary greatly, but elements having a high proportion of resin and a low proportion of photoconductive compound are the less desired. Mixtures of at least equal parts resin and photoconductive compound are preferred.

The substrate material, if one is desired, may be any which satisfy the requirements of electrophotography such as metal, glass, paper, or plastic. Unless it is to be used in a device employing dual corona discharge, such as U.S. Pat. 2,922,883, the substrate should preferably have a conductivity greater than $10^{-10}$ ohm$^{-1}$ cm.$^{-1}$.

Application of the solutions of the compounds of the general class, with or without resins, is in the usual manner, such as by spraying, doctor blade, meniscus coating, etc., followed by drying.

One type of electrophotographic process in which the compounds of the present invention are useful is known as xerography. This process comprises the laying down of the uniform electrostatic charge on a photoconductive insulating element, exposing the electrostatic charge surface to a pattern of light to effect a decay of charge in illuminated areas, and contacting the latent electrostatic image thus formed with colored electroscopic powder to render the image visible. Next, a copy sheet is brought into contact with the developed image and transferred thereto and fixed thereon. The residual toner remaining on the photoconductive insulating element is removed by cleaning and the element is then ready for the preparation of the next copy of the next cycle.

Because they have the additional advantage of being dichroic, the compounds of the present invention are suitable for use in that type of electrophotography known as contact reflex reproduction, which is an electrophotographic process for the production of reflex copies in which a document is positioned adjacent a photoconductive element which exhibits photoconductive dichroism and has a preferred absorption axis, and in which the photoconductive element is uniformly exposed through the photoconductive element with polarized light whose vector, relative to the absorption axis, is such that the light is not absorbed. The polarized light in striking the document is absorbed in some areas, normally the dark image areas, and depolarized and reflected in others, normally the light background areas. The light from the reflected areas, being depolarized, contains light with an electric vector which will be absorbed by the photoconductive element and the element is thus exposed to a pattern corresponding to the pattern of the document. This renders the photoconductive element conductive and capable of transporting an electrostatic charge and, hence, permits the formation of an electrostatic charge pattern corresponding to the document.

PREFERRED EMBODIMENTS

The general nature of the invention having been set forth, the following examples are now presented as to the specific preparation of compounds falling within the above general class and the specific preparation of these compounds into photoconductive elements which are then used in electrophotographic processes. The specific details presented are for purposes of illustration and not limitation.

EXAMPLE I 2,6 bis(p-dimethylaminobenzylideneamino)9,10 anthraquinone

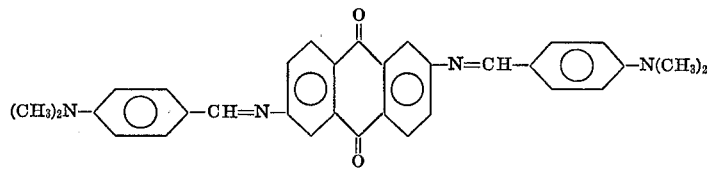

A mixture of 2 g. of 2,6 diaminoanthraquinone and 15 g. of p-dimethylaminobenzaldehyde were heated at 240–250° C. for about 15 minutes. The reaction mixture was cooled, triturated with acetone and filtered. The dark solids were then slurried in hot dimethylformamide and filtered. These solids were analyzed and were shown to be the title compound by the following results:

Calcd. for $C_{32}H_{28}N_4O_2$ (percent): C, 76.78; H, 5.64; N, 11.19. Found (percent): C, 76.65; H, 5.55; N, 11.31.

EXAMPLE II 2,6 bis(p-dimethylaminocinnamylideneamino)9,10 anthraquinone

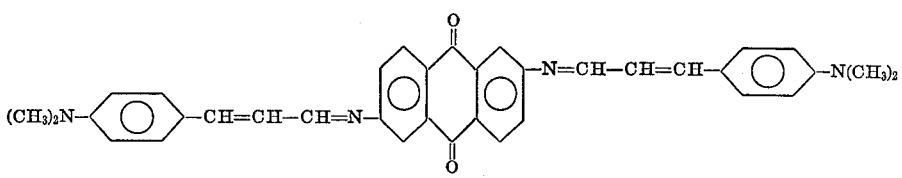

A mixture of 1 g. of 9,10-anthraquinone and 3.5 g. of p-dimethylaminocinnamaldehyde were heated at 240–250° C. for 15 minutes. The reaction mixture was then treated in the same manner as in Example I. The dark solids were analyzed as follows.

Calcd. for $C_{36}H_{32}N_4O_2$ (percent): C, 78.24; H, 5.83; N, 10.14. Found (percent): C, 77.99; H, 5.83; N, 10.31.

EXAMPLE III

A photoconductive element was prepared by dispersing 2,6 bis(p-dimethylaminobenzylideneamino)9,10 anthraquinone (the compound prepared in Example I above) in an equal weight of polystyrene dissolved in 1,2-dichloroethane and coating the solution on an aluminum slide with a doctor blade set at a 5 mil wet gap. The thus prepared photoconductive element was uniformly electrostatically charged using a Xerox Model D Processor at a potential of +7000 volts. After charging, the element was exposed to a 375 watt GE Photo EBR lamp at a distance of 12 inches for 2 seconds and using positive transparency as a document to be copied. The formed electrostatic image was developed with negatively charged toner (Xerox 914) across the photoconductive element. Again using the Xerox Model D Processor, the toner image was transferred to paper by spraying positive charges on the back of the paper. After transfer of the toner image, the toner was fused to the paper on a hot plate to yield a high quality copy of the document with high contrast, high image density, and faint background.

EXAMPLE IV

A photoconductive element was prepared by dispersing 2,6 bis(p-dimethylaminocinnamylideneamino)9,10 anthraquinone (the compound of Example II above) in an equal weight of polystyrene dissolved in 1,2-dichloroethane and coating the solution on an aluminum slide with a doctor blade set at a 5 mil wet gap. The thus prepared photoconductive element was uniformly electrostatically charged using a Xerox Model D Processor at a potential of +7000 volts. After charging, the element was exposed to a 375 watt GE Photo EBR lamp at a distance of 12 inches for 0.1 second and using positive transparency as a document to be copied. The formed electrostatic image was developed with negatively charged toner (Xerox 914) across the photoconductive element. Again using the Xerox Model D Processor, the toner image was transferred to paper by spraying positive charges on the back of the paper. After transfer of the toner image, the toner was fused to the paper on a hot plate to yield a high quality copy of the document with high contrast, high image density, and faint background.

EXAMPLE V

Aluminized cellulose acetate is coated by means of a meniscus coater with 4% of a copolymer of methyl vinyl ether and maleic anhydride in water. The film is allowed to air dry overnight.

The compound of Example I above is applied to the above film by hand application in a linear direction along the length of the web. On top of this there is coated the following formulation:

40 g. 10% polyvinyl carbazole in benzene
20 g. benzene
30 g. chloroform
10 g. toluene
0.04 g. 1,3-dinitronaphthalene
8 g. of 1% benzene solution of a plasticizer consisting of a combination of polymers of esters of acrylic acid and methacrylic acid.

This formulation is coated at 3 feet per minute on a miniscus coater and cured for 1 hour at 90° C. Electrometer results show a charge acceptance of about 600 v. The film is used to make robot copies in the contact reflex mode.

While the invention has been shown and described with reference to preferred embodiments thereof, it will be appreciated by those skilled in the art that variations in form may be made therein without departing from the spirit and scope of the invention.

What is claimed is:
1. The compounds having the formula:

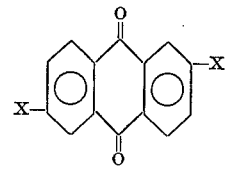

with both X moieties being the same and being selected from the group consisting of

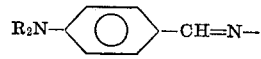

and
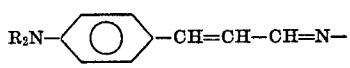
wherein R is a lower alkyl group.
2. A compound as claimed in claim 1, 2,6 bis(p-dimethylaminobenzylideneamino)9,10 anthraquinone.
3. A compound as claimed in claim 1, 2,6 bis(p-dimethylaminocinnamylideneamino)9,10 anthraquinone.
References Cited
UNITED STATES PATENTS
3,184,482  5/1965  Steiger _____ 260—378
FOREIGN PATENTS
979,869  1/1965  Great Britain _____ 260—378
LEWIS GOTTS, Primary Examiner
R. GERSTL, Assistant Examiner